US008185148B2

(12) United States Patent
Kamat

(10) Patent No.: US 8,185,148 B2
(45) Date of Patent: *May 22, 2012

(54) SYSTEM AND METHOD FOR NOTIFYING USERS OF AN EVENT USING ALERTS

(75) Inventor: Harshad N. Kamat, Maple Valley, WA (US)

(73) Assignee: Research In Motion Limited, Waterloo, Ontario (CA)

( * ) Notice: Subject to any disclaimer, the term of this patent is extended or adjusted under 35 U.S.C. 154(b) by 63 days.

This patent is subject to a terminal disclaimer.

(21) Appl. No.: 12/778,284

(22) Filed: May 12, 2010

(65) Prior Publication Data
US 2010/0222029 A1 Sep. 2, 2010

Related U.S. Application Data

(63) Continuation of application No. 11/554,318, filed on Oct. 30, 2006, now Pat. No. 7,747,288, which is a continuation of application No. 10/780,423, filed on Feb. 17, 2004, now Pat. No. 7,162,223.

(51) Int. Cl.
*H04M 1/00* (2006.01)

(52) U.S. Cl. .......... 455/550.1; 455/418; 455/426.1; 709/228

(58) Field of Classification Search .......... 455/550.1, 455/418, 426.1; 709/228
See application file for complete search history.

(56) References Cited

U.S. PATENT DOCUMENTS

| 6,125,281 | A | 9/2000 | Wells et al. .................. 455/466 |
| 6,463,056 | B1 | 10/2002 | Silva et al. .................. 370/356 |
| 6,463,462 | B1 | 10/2002 | Smith et al. .................. 709/206 |
| 6,779,030 | B1* | 8/2004 | Dugan et al. .................. 709/223 |
| 2002/0087643 | A1 | 7/2002 | Parsons et al. .................. 709/206 |
| 2002/0087704 | A1* | 7/2002 | Chesnais et al. .................. 709/228 |
| 2002/0129354 | A1 | 9/2002 | Bryan et al. .................. 717/176 |
| 2002/0173304 | A1 | 11/2002 | Horompoly .................. 455/426 |
| 2003/0050984 | A1 | 3/2003 | Pickup et al. .................. 709/206 |
| 2003/0193967 | A1 | 10/2003 | Fenton et al. .................. 370/490 |
| 2003/0233420 | A1 | 12/2003 | Stark et al. .................. 709/206 |
| 2004/0002988 | A1 | 1/2004 | Seshadri et al. .................. 707/102 |
| 2004/0019537 | A1 | 1/2004 | Luo et al. .................. 705/28 |
| 2004/0044674 | A1 | 3/2004 | Mohammadioun et al. .. 707/100 |
| 2004/0057572 | A1 | 3/2004 | O'Connor et al. ....... 379/266.01 |

(Continued)

FOREIGN PATENT DOCUMENTS

| WO | 97/49251 | 12/1997 |
| WO | 02/49373 | 6/2002 |
| WO | 03/054710 | 7/2003 |

OTHER PUBLICATIONS

Oracle9iAS Wireless Datasheet, 2001; http://otn.oracle.com/products/iaswe/htdocs/datasheet.pdf.

(Continued)

*Primary Examiner* — Danh Le
(74) *Attorney, Agent, or Firm* — Allen, Dyer, Doppelt, Milbrath & Gilchrist, P.A.

(57) ABSTRACT

An alert engine module receives an alert for an event in a generic communications format and delivers an alert for the event to a target address in a communications format that is preferred by a user based on the alert content. The generic format can be an e-mail message, such as a Simple Mail Transfer Protocol (SMTP) message. The alert engine can be operative to transform the alert based on a header and/or format of a target address.

15 Claims, 3 Drawing Sheets

U.S. PATENT DOCUMENTS

| | | | |
|---|---|---|---|
| 2004/0064480 A1 | 4/2004 | Bartlett et al. | 707/104.1 |
| 2005/0010454 A1 | 1/2005 | Falk et al. | 705/4 |
| 2005/0027742 A1 | 2/2005 | Eichstaedt et al. | 707/104.1 |
| 2005/0058268 A1 | 3/2005 | Koch | 379/207.16 |
| 2005/0091269 A1* | 4/2005 | Gerber et al. | 707/103 X |
| 2005/0097473 A1 | 5/2005 | Malik et al. | 715/739 |

OTHER PUBLICATIONS

Content Delivery for Wireless Applications, Birlasoft, 2003; http://www.birlasoft.com/white/wirelesscontentdelivery.pdf.

* cited by examiner

SYSTEM AND METHOD FOR NOTIFYING USERS OF AN EVENT USING ALERTS

RELATED APPLICATIONS

This application is a continuation of Ser. No. 11/554,318 filed Oct. 30, 2006 now U.S. Pat. No. 7,747,288, which is a continuation of Ser. No. 10/780,423 filed Feb. 17, 2004 (now U.S. Pat. No. 7,162,223), the disclosures of which are hereby incorporated by reference in their entirety.

FIELD OF THE INVENTION

The present invention relates to communications and electronic messaging, and more particularly, the present invention relates to a system and method for notifying a user of an event using an alert.

BACKGROUND OF THE INVENTION

Users of electronic mail and messaging systems often want to be notified of an event, which could be a notification that an e-mail message has been received in a mailbox or be a notification regarding a telephone message, stock quote notification, or other notification regarding a received message. Sometimes a user may have a preferred medium or communications format for receiving the alert, including an e-mail Short Messaging Service (SMS) message, a Wireless Application Protocol (WAP) message, or other type of message to be delivered in a communications format that is preferred by the user at the destination or target address.

There have been a number of prior art proposals for solving these problems and providing alerts for events. For example, sometimes an alert is delivered to a distribution engine in an output communications format desired by the user. This distribution engine, however, performs no transformation of an alert into a communications format desired by a user or destination address. Thus, any alert must be input in the desired format. In yet another proposal, the input format to an alert system can originate from a variety of sources, and can be in the form Hypertext Transfer Protocol (HTTP), local files, File Transfer Protocol (FTP), Structured Query Language (SQL), and other multiple formats. In this prior art proposal, the alert system appears to have access to a user's personal information and settings, but there is not transformation into a desired communications format.

U.S. published patent application no. 2002/0087643 provides a notification system and generates alerts. Messages are left for a user, for example, a voice mail, an e-mail, or a CRM event. Different folders are maintained by messaging services. The notification system detects any additions to a user's folders and when a new message arrives, the notification system sends an alert to a Wireless Access Protocol (WAP) enabled device, e.g., cell phone, configured for the user. The alert can include a number of messages of each type received for the user and an indication of a most recently received message. The notification system could monitor an information source for new information that may be of interest to the user and provide these as an alert notification when certain conditions are met.

In U.S. published patent application no. 2002/0129354, a series of templates allows a user to define events and information alerts to be triggered by the events. A knowledge switch uses event definitions and contacts and schedules information to detect events and distributes alerts to intended recipients when an event occurs.

Many of these prior art proposals identified above do not provide an alert to a user in a communications medium or protocol preferred by a user, at the target address desired by the user, whether e-mail or mobile phone. For example, different users could desire an alert in the form of an e-mail, SMS, WAP or other communications protocol. Also, it would be desirable if any alert engine that delivers an alert has access to a user profile in order to deliver this alert in a communications format preferred by the user.

SUMMARY OF THE INVENTION

The present invention advantageously allows a user to be notified of an event by means of an alert. The alert content is first received in an alert engine module in a generic communications format, for example, an e-mail over the Simple Mail Transfer Protocol (SMTP). The alert engine module transforms this alert and delivers the alert to an intended user at a target address in a communications format that is preferred by a user typically based on alert content.

In yet another aspect of the present invention, the alert engine is operative to transform the alert based on a header and/or format of a target address. The alert engine module could be operative to deliver the alert to an appropriate gateway in the preferred communications format. This target address could be a mobile device and the alert engine module could be operative for transforming the alert that is received by the alert engine module into a format based on the type of mobile device.

The communications format could be a short messaging service message, which could be the default type of communications format or protocol. The communications format could also be a Wireless Application Protocol (WAP) message, an e-mail message, an over-the-air (OTA) message or a pocket PC (PPC) message.

In yet another aspect of the present invention, an input queue will queue a plurality of events, typically all based on the generic communications format. The alert engine pulls alerts from the input queue and delivers each alert for a respective event to a target address in the preferred communications format. The target address, of course, could be an appropriate gateway. An output queue can queue alerts for delivery.

A method and computer readable medium are also disclosed and set forth.

BRIEF DESCRIPTION OF THE DRAWINGS

Other objects, features and advantages of the present invention will become apparent from the detailed description of the invention which follows, when considered in light of the accompanying drawings in which.

DETAILED DESCRIPTION OF THE PREFERRED EMBODIMENTS

The present invention will now be described more fully hereinafter with reference to the accompanying drawings, in which preferred embodiments of the invention are shown.

This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout, and prime notation is used to indicate similar elements in alternative embodiments.

The present invention advantageously permits a user to be notified of an event by having an alert engine module receive a message alert for an event in a generic communications format, such as over SMTP, and transforming the alert into a communications format that is preferred by a user at a target address such as based on alert content. The alert is delivered to the target address, such as through a gateway for that desired communications format. The present invention is advantageous over other prior art proposals that deliver alerts to a distribution engine in an output format without transformation. These prior art proposals typically mandate that the input format must be the format desired by a user. The present invention is also advantageous over other prior art proposals where an input format to a system could be from a variety of sources such as Hypertext Transfer Protocol (HTTP), local files, File Transfer Protocol (FTP), and Structured Query Language (SQL) in multiple formats. In the present invention, the alert system has access to any personal information of a user based on the output format for the alert.

Figure 1:
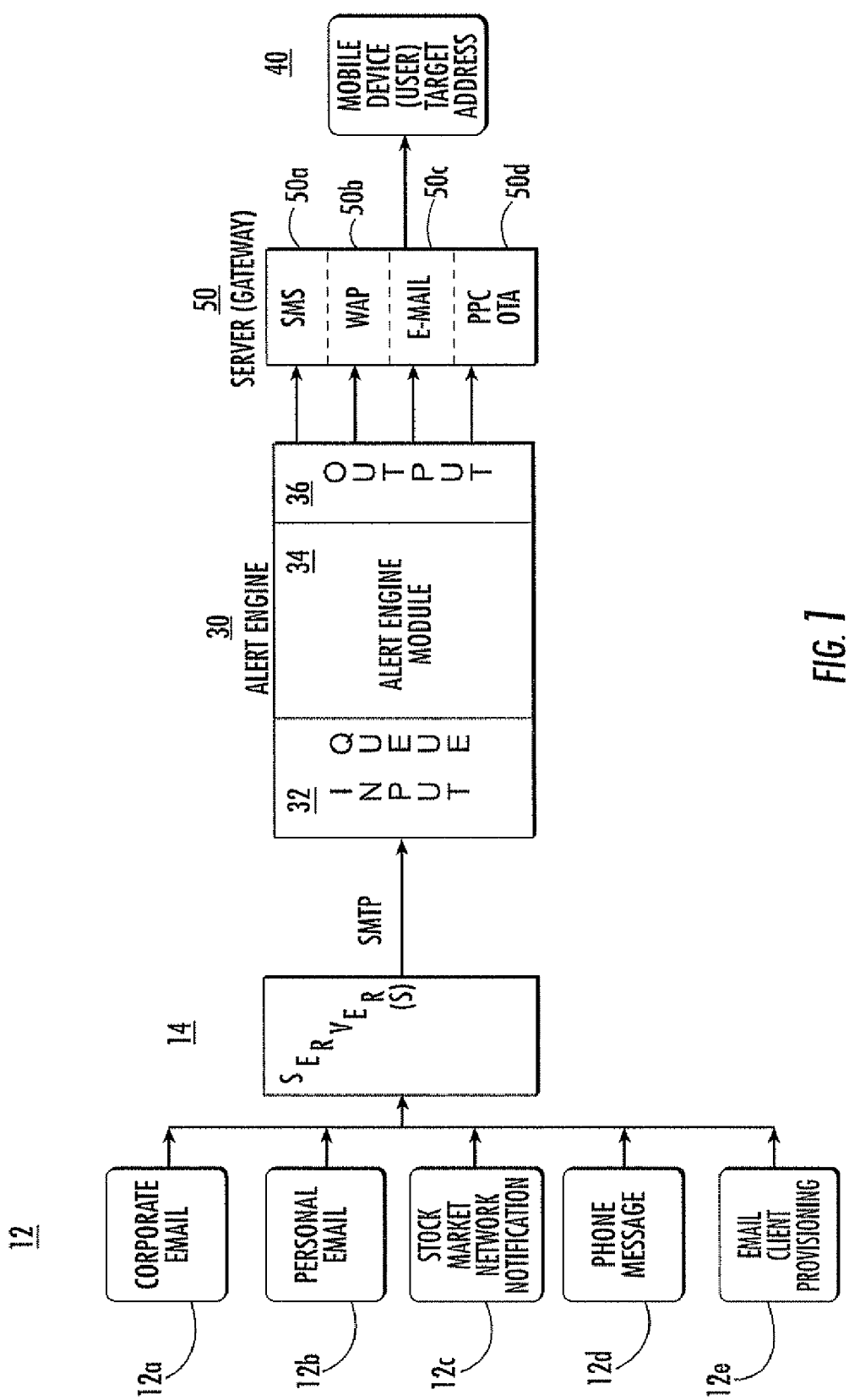
FIG. 1 is a block diagram of an example of a system that can be used for the present invention that notifies a user of an event.

FIG. 1 illustrates at 10 a block diagram of one example of a system that could be used for the present invention. A number of sources 12 cause events and inputs as messages into a server 14. These sources 12 are illustrated as examples only and include a corporate e-mail 12a, personal e-mail 12b, stock market network news 12c, phone message 12d, and e-mail client provisioning document 12e for over-the-air (OTA) messages. These sources 12 can deliver an e-mail message as an event or deliver other messages as events to a mail or other server 14. A SMTP message 20 is forwarded as an alert from the server 14. The server 14, of course, could be any number of servers for the different sources.

The alert engine is shown generally at 30 and includes an input queue 32, an alert engine module 34, and an output queue 36. Typically, the alert is forwarded as a message to the alert engine 30 over SMTP. The alert engine 30 queues the alerts in the input queue 32. The alert engine module 34 pulls each alert from the input queue 32 and transforms the alert into the communications format desired by a user at a target address 40, for example, a user's mobile device, such as a hand-held Blackberry unit. The communications format could be, but not limited to, Short Message Service (SMS), Wireless Application Protocol (WAP), e-mail, pocket PC (PPC), which is typically over-the-air (OTA). The desired format or protocol can be chosen based on certain headers and/or the format at a target address. Typically, the alert engine module 32 is operative with the output queue 34, such that successive alerts can be output for later delivery to a target address. As illustrated, the target address could include a gateway 50 as a server for the type of communications protocol desired. The gateway could be a single or multiple gateway for the illustrated SMS 50a, WAP 50b, E-mail 50c, and PPC, OTA 50d, as non-limiting examples. The original message or event as sent over SMTP to the alert engine 30 could have header information with details required for transforming the message and accessing the user device. POP proxy servers and other servers could be used. The output could vary and include corporate intranets or other intranets and internets.

In one aspect of the invention, the SMS message is the default message that the alert engine module 34 transforms. It should be understood that SMS is a wireless service and encompasses different embodiments for transmitting alphanumeric messages. SMS can be used in many different personal communications service (PCS) networks, including TDMA, CDMA and GSM systems. It can include a point-to-point system using a Shortened Message Service Center (SMSC) to store-and-forward short messages. Alerts can be received any time whether a voice or data call is in existence. It includes out-of-band packet delivery and low bandwidth message transfer.

The SMS network architecture could include a short messaging entity (SME) and a short message service center (SMSC) to relay and store-and-forward a short message. The SMS system could include a SMS-gateway/interworking mobile switching center (SMS-GMSC), home location register (HLR), mobile switching center (MSC), visitor location register (VLR), base station system (MS), and of course, the mobile station (MS). It can use a Mobile Application Part (MAP) layer and use an SS7 Transaction Capable Application Part (TCAP). MAP operations could include a routing information request and point-to-point short message delivery and a short message waiting indication. The SMS system could also include a service center alert. Different services could include a mobile-originated short message (MO-SM) or a mobile-terminated short message (MT-SM). Many different characters can be stored.

A Wireless Application Program (WAP) could define an application environment and communication protocol for wireless devices to communicate across the internet. Applications could be written in a wireless mark-up language (WML), a subset of the extensive mark-up language (XML). The architecture could use a WAP datagram protocol (WDP) as a transport layer. A Wireless Transport Layer Security (WTLS) can add security. The WAP session protocol (WSP) layer could be a session layer and the HTTP interface retrieves WAP content.

As to the PPC (pocket PC), OTA (over-the-air) message communications for alerts, the system can be used in conjunction with a short messaging service and allow transfer of small text files. OTA messages can be encrypted. There is an OMA (open mobile alliance) document on OTA provisioning of WAP clients as mobile devices. This specification is used initially to provision unconfigured WAP clients. In the present system, it is possible to support this over the air provisioning of WAP clients. For example, a user may provision access to an ISP/corporate e-mail mailbox in the present system. If the mobile device (phone or PDA) has a POP or IMAP client, then it is possible for the user to access their ISB e-mail using the system POP or IMAP proxy respectively. In order to accomplish this, the user would have to type in the user ID, password, POP server name, POP server port and whether to keep a copy on the server or not and other parameters in the POP client on their phone or PDA. This task of typing in parameters used in the phone keyboard would be very frustrating to the user.

The present invention would alleviate this problem by creating an OTA provisioning document containing a user's user ID, password, the system POP (or IMAP) proxy server's name, port and other default parameters. This could be sent in an e-mail to the alert engine. The alert engine would transform this e-mail to suit the target device and deliver it to the gateway or server. When the gateway delivers this message to the target device, it would configure the user's POP client with these parameters and the target device becomes operable. The user can now access their e-mail without having to know and type in any of the parameters required to use the system POP server.

This message can be created and sent to the alert engine when the user provisions a new account or modifies their settings or deletes a provisioned mailbox. In the instance when the user modifies their settings, the OTA-provisional document modifies the settings on the device. In the instance when the user deletes a provisioned mailbox, the OTA-provisional document deletes the settings from the POP client on the device. Although the mechanism of provisioning a target device's e-mail (POP/IMAP) client over-the-air is targeted at PPC users, it is possible to extend this to various mobile phones and devices that support the OMA OTA/provisional specification.

It should be understood that the software and programming used for the present invention can vary, and different applications can be used to accomplish the purpose and functions of the present invention. Many types of web service technology can be used, including different application services used by those skilled in the art. Web services could include a combination of programming and data, which are available from a web server for web users, or the use of other web-connected programs as provided by an application service provider. Web services could use an extensible mark-up language (XML) as a standard for formatting data to be communicated.

Different communication arrangements could be used, including peer-to-peer, use of a central server, or other architecture and communication systems, including middleware. Data formats could be standardized and data exchanged using an extensive mark-up language (XML), which is the foundation for the web services description language (WSDL). Different web servers could also be used, including the open source Apache or Microsoft's Internet Information Server (IIS). Other web services could include Novell's web server for users of its netware operating system or the IBM family of Lotus Domino service, for example, for IBM's OS/390 and AS/400 customers.

Any web server could download requests for File Transfer Protocol (FTP) files. Different servers could include a Messaging Application Programming Interface (MAPI) and provide an Application Programming Interface (API). Configuration data objects and format data objects could be generated using an extensible mark-up language (XML) for submission to various XML-compliant web services. Any server and web service could be a Simple Object Access Protocol (SOAP) compliant service. SOAP would allow one program running in one kind of operating system to communicate with a program in the same or another type of operating system by using HTTP and XML for information exchange.

ActiveX controls could be used as Component Object Models (COM) and provide a framework for building software components that communicate with each other. ActiveX controls could be automatically downloaded and executed by a web browser. Distributed object applications could be built in active web pages and ActiveX controls could be downloaded to different browsers and client. ActiveX controls could be held in a web browser as a container and distributed over an internet or corporate intranet. ActiveX controls could also manage and update web content and client systems and work closely with a user interface of a targeted operating system. JAVA objects or similar component objects could be used instead of ActiveX controls. An object model control could also be any type of Dynamic Link Library (DLL) module that runs in a container.

Figure 2:
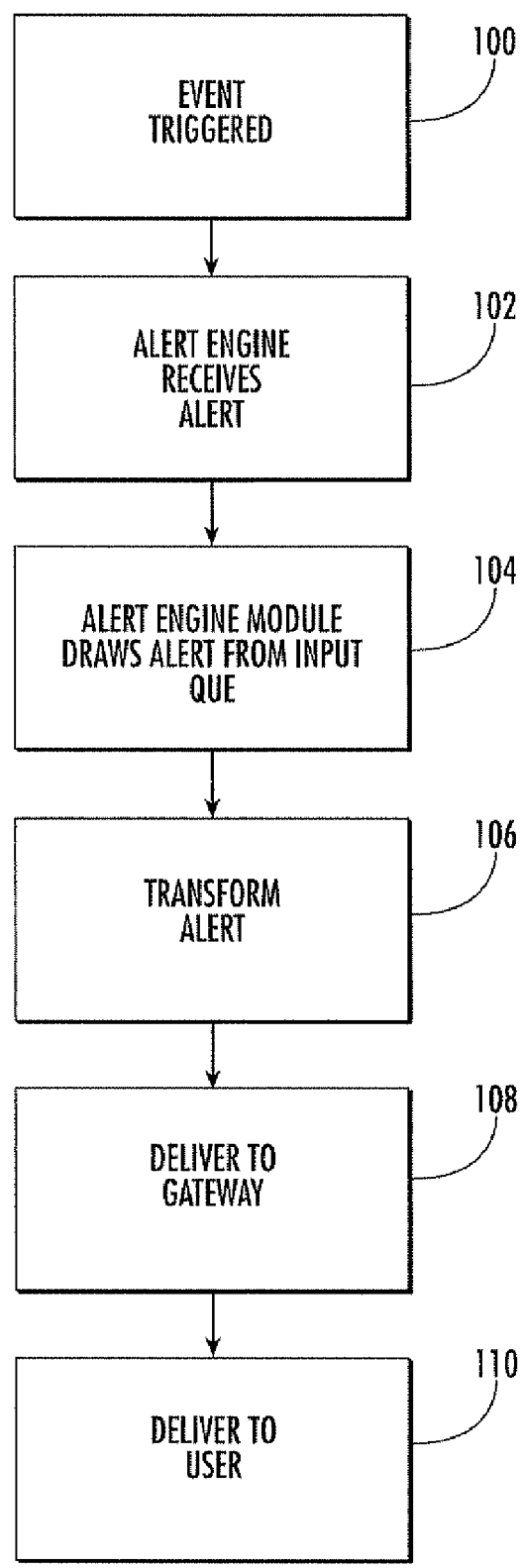
FIG. 2 is a high level block diagram of an example of the method of the present invention.

FIG. 2 illustrates a high level block diagram of an example of the method of the present invention of notifying a user of an event. An event is triggered to the server 14 (block 100). An alert for the event is received at the alert engine over SMTP (block 102). It is stored temporarily in the input queue. The alert engine module draws the alert from the input queue (block 104).

The alert is transformed into a communications format that is preferred at the target address (block 106). The alert is delivered from the alert engine module through the output to a gateway server for a preferred communications format (block 108). From the gateway, the alert can be delivered to a user in a preferred communications format (block 110).

The present invention advantageously permits a user to be notified of an event by means of an alert, for example, based on the alert content, which is first received in an alert engine module in a generic format, for example, an e-mail that comports with the Simple Mail Transfer Protocol (SMTP). The alert engine module transforms the alert and delivers the alert to the intended user at a target address in a communications format that is preferred by the user based on alert content. The generic format could be an e-mail message that comports with the Simple Mail Transfer Protocol (SMTP).

An exemplary hand-held mobile wireless communications device 1000 that can be used in the present invention is further described in the example below with reference to FIG. 3. The device 1000 includes a housing 1200, a keyboard 1400 and an output device 1600. The output device shown is a display 1600, which is preferably a full graphic LCD. Other types of output devices may alternatively be utilized. A processing device 1800 is contained within the housing 1200 and is coupled between the keyboard 1400 and the display 1600. The processing device 1800 controls the operation of the display 1600, as well as the overall operation of the mobile device 1000, in response to actuation of keys on the keyboard 1400 by the user.

The housing 1200 may be elongated vertically, or may take on other sizes and shapes (including clamshell housing structures). The keyboard may include a mode selection key, or other hardware or software for switching between text entry and telephony entry.

Figure 3:
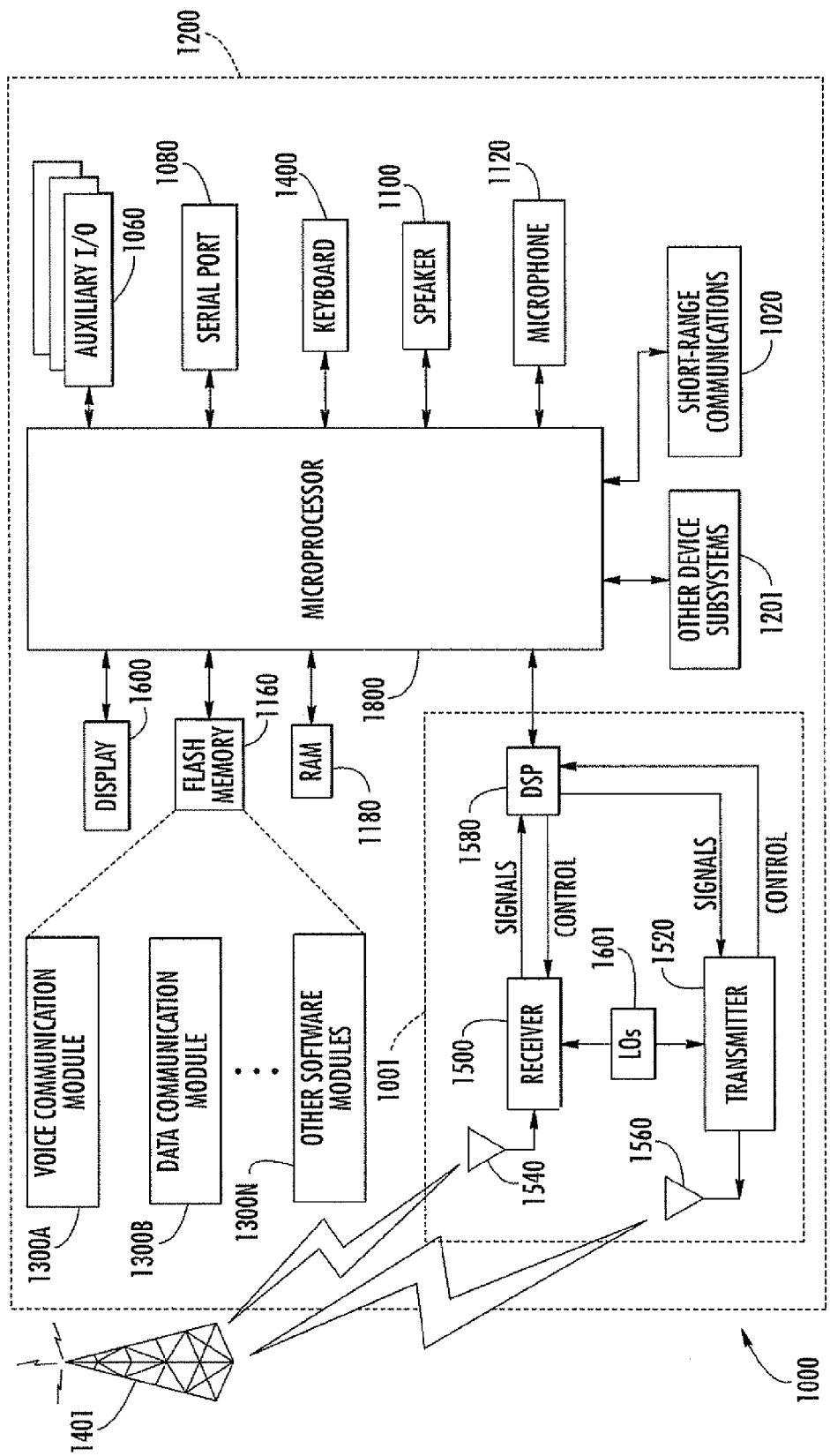
FIG. 3 is a schematic block diagram illustrating an exemplary mobile wireless communications device for use in the present invention.

In addition to the processing device 1800, other parts of the mobile device 1000 are shown schematically in FIG. 3. These include a communications subsystem 1001; a short-range communications subsystem 1020; the keyboard 1400 and the display 1600, along with other input/output devices 1060, 1080, 1100 and 1120; as well as memory devices 1160, 1180 and various other device subsystems 1201. The mobile device 1000 is preferably a two-way RF communications device having voice and data communications capabilities. In addition, the mobile device 1000 preferably has the capability to communicate with other computer systems via the Internet.

Operating system software executed by the processing device 1800 is preferably stored in a persistent store, such as the flash memory 1160, but may be stored in other types of memory devices, such as a read only memory (ROM) or similar storage element. In addition, system software, specific device applications, or parts thereof, may be temporarily loaded into a volatile store, such as the random access memory (RAM) 1180. Communications signals received by the mobile device may also be stored in the RAM 1180.

The processing device 1800, in addition to its operating system functions, enables execution of software applications 1300A-1300N on the device 1000. A predetermined set of applications that control basic device operations, such as data and voice communications 1300A and 1300B, may be installed on the device 1000 during manufacture. In addition, a personal information manager (PIM) application may be installed during manufacture. The PIM is preferably capable of organizing and managing data items, such as e-mail, calendar events, voice mails, appointments, and task items. The PIM application is also preferably capable of sending and receiving data items via a wireless network 1401. Preferably, the PIM data items are seamlessly integrated, synchronized and updated via the wireless network 1401 with the device user's corresponding data items stored or associated with a host computer system. Communication functions, including data and voice communications, are performed through the communications subsystem 1001, and possibly through the short-range communications subsystem. The communications subsystem 1001 includes a receiver 1500, a transmitter 1520, and one or more antennas 1540 and 1560. In addition, the communications subsystem 1001 also includes a processing module, such as a digital signal processor (DSP) 1580, and local oscillators (LOs) 1601. The specific design and implementation of the communications subsystem 1001 is dependent upon the communications network in which the mobile device 1000 is intended to operate. For example, a mobile device 1000 may include a communications subsystem 1001 designed to operate with the Mobitex™, Data TAC™ or General Packet Radio Service (GPRS) mobile data communications networks, and also designed to operate with any of a variety of voice communications networks, such as AMPS, TDMA, CDMA, PCS, GSM, etc. Other types of data and voice networks, both separate and integrated, may also be utilized with the mobile device 1000.

Network access requirements vary depending upon the type of communication system. For example, in the Mobitex and DataTAC networks, mobile devices are registered on the network using a unique personal identification number or PIN associated with each device. In GPRS networks, however, network access is associated with a subscriber or user of a device. A GPRS device therefore requires a subscriber identity module, commonly referred to as a SIM card, in order to operate on a GPRS network.

When required network registration or activation procedures have been completed, the mobile device 1000 may send and receive communications signals over the communication network 1401. Signals received from the communications network 1401 by the antenna 1540 are routed to the receiver 1500, which provides for signal amplification, frequency down conversion, filtering, channel selection, etc., and may also provide analog to digital conversion. Analog-to-digital conversion of the received signal allows the DSP 1580 to perform more complex communications functions, such as demodulation and decoding. In a similar manner, signals to be transmitted to the network 1401 are processed (e.g. modulated and encoded) by the DSP 1580 and are then provided to the transmitter 1520 for digital to analog conversion, frequency up conversion, filtering, amplification and transmission to the communication network 1401 (or networks) via the antenna 1560.

In addition to processing communications signals, the DSP 1580 provides for control of the receiver 1500 and the transmitter 1520. For example, gains applied to communications signals in the receiver 1500 and transmitter 1520 may be adaptively controlled through automatic gain control algorithms implemented in the DSP 1580.

In a data communications mode, a received signal, such as a text message or web page download, is processed by the communications subsystem 1001 and is input to the processing device 1800. The received signal is then further processed by the processing device 1800 for an output to the display 1600, or alternatively to some other auxiliary I/O device 1060. A device user may also compose data items, such as e-mail messages, using the keyboard 1400 and/or some other auxiliary I/O device 1060, such as a touchpad, a rocker switch, a thumb-wheel, or some other type of input device. The composed data items may then be transmitted over the communications network 1401 via the communications subsystem 1001.

In a voice communications mode, overall operation of the device is substantially similar to the data communications mode, except that received signals are output to a speaker 1100, and signals for transmission are generated by a microphone 1120. Alternative voice or audio I/O subsystems, such as a voice message recording subsystem, may also be implemented on the device 1000. In addition, the display 1600 may also be utilized in voice communications mode, for example to display the identity of a calling party, the duration of a voice call, or other voice call related information.

The short-range communications subsystem enables communication between the mobile device 1000 and other proximate systems or devices, which need not necessarily be similar devices. For example, the short-range communications subsystem may include an infrared device and associated circuits and components, or a Bluetooth™ communications module to provide for communication with similarly-enabled systems and devices.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

The invention claimed is:

1. A system for notifying a user of an event comprising:
at least one server that receives and stores a data or voice message and based on header information for the data or voice message, generates an alert as an event corresponding to the stored data or voice message in a message format that is less than the stored data or voice message; and
an alert engine module that receives the alert corresponding to a stored message on the at least one server and transforms the alert one time from the message format that is less than the stored data or voice message into a Short Messaging Service (SMS) message.

2. A system according to claim 1, wherein the alert engine module is operative for delivering the alert as the SMS message to a target address preferred by a user.

3. A system according to claim 1, wherein the user is able to retrieve later the stored message on the at least one server based on the received alert.

4. A system according to claim 1, wherein said alert engine module is operative to transform the alert into the SMS message based on a header and/or format of a target address.

5. A system according to claim 1, wherein said alert engine module is operative to deliver the alert to an appropriate gateway for the SMS message.

6. A system according to claim 1, wherein said target address comprises a mobile device.

7. A system according to claim 1, wherein said alert engine module is operative for transforming the alert based on the type of mobile device.

8. A system according to claim 1, wherein the message format that is less than the stored data or voice message comprises a Simple Mail Transfer Protocol (SMTP).

9. A method of notifying a user of an event comprising the steps of:

receiving and storing a data or voice message within a server, and based on header information for the data or voice message, generating an alert as an event corresponding to the stored data or voice message in a message format that is less than the stored data or voice message;

receiving the alert within an alert engine module; and transforming the alert one time from the message format that is less than the stored data or voice message into a Short Messaging Service (SMS) message.

10. A method according to claim 9, which further comprises delivering the alert as the SMS message from the alert engine module to a target address preferred by a user.

11. A method according to claim 9, which further comprises later retrieving the stored message on the at least one server based on the received alert.

12. A method according to claim 9, and further comprising the step of transforming the alert into the SMS message based on a header and/or format of a target address.

13. A method according to claim 9, and further comprising the step of delivering the alert to an appropriate gateway for the SMS message.

14. A method according to claim 9, and further comprising delivering the alert to a mobile device.

15. A method according to claim 9, wherein the message format that is less than the stored data or voice message comprises a Simple Mail Transfer Protocol (SMTP).

* * * * *